US012057241B1

(12) United States Patent
Baida et al.

(10) Patent No.: US 12,057,241 B1
(45) Date of Patent: Aug. 6, 2024

(54) CONTAINER FILLING SYSTEM FOR RADIOACTIVE MATERIALS

(71) Applicant: Jubilant Draximage Inc., Montreal (CA)

(72) Inventors: Chadi Baida, St. Leonard, CA (US); Dominic Siewko, Middleton, MA (US)

(73) Assignee: Jubilant Draximage Inc., Montreal (CA)

(*) Notice: Subject to any disclaimer, the term of this patent is extended or adjusted under 35 U.S.C. 154(b) by 432 days.

(21) Appl. No.: 17/568,307

(22) Filed: Jan. 4, 2022

Related U.S. Application Data

(60) Provisional application No. 63/133,966, filed on Jan. 5, 2021.

(51) Int. Cl.

| | |
|---|---|
| ***G21F 5/00*** | (2006.01) |
| ***G21F 5/002*** | (2006.01) |
| ***G21F 5/14*** | (2006.01) |
| *G21F 5/018* | (2006.01) |

(52) U.S. Cl.
CPC ................ *G21F 5/002* (2013.01); *G21F 5/14* (2013.01); *G21F 5/018* (2013.01)

(58) Field of Classification Search
CPC ............. G21F 5/002; G21F 5/14; G21F 5/018
See application file for complete search history.

(56) References Cited

U.S. PATENT DOCUMENTS

| | | | | |
|---|---|---|---|---|
| 2008/0142743 | A1 | 6/2008 | Tartaglia | |
| 2008/0166292 | A1* | 7/2008 | Levin | A61M 5/1723 600/431 |
| 2010/0206425 | A1 | 8/2010 | Tartaglia | |
| 2011/0178359 | A1* | 7/2011 | Hirschman | G21G 4/08 600/4 |
| 2011/0209764 | A1* | 9/2011 | Uber | A61M 5/007 220/501 |
| 2015/0335531 | A1 | 11/2015 | Yuyama et al. | |
| 2016/0303397 | A1 | 10/2016 | Hirschman et al. | |
| 2017/0172527 | A1* | 6/2017 | Uber, III | A61B 6/5264 |

* cited by examiner

*Primary Examiner* — Nicole M Ippolito
(74) *Attorney, Agent, or Firm* — BakerHostetler

(57) ABSTRACT

Provided are systems for filling containers with radioactive and/or other types of potentially hazardous materials. In some aspects, the systems include a shielding material that substantially defines a chamber and, preferably, substantially blocks radioactivity, a conduit extending from outside to into the chamber, and a unit that is disposed in the chamber proximal to the conduit and is adapted to receive a capsule through the conduit. The systems of the present disclosure can further comprise a syringe, a syringe controller that is disposed in the dispensing chamber and adapted to meter an aliquot from a radioactive stock solution and inject the aliquot into the capsule or a vial.

35 Claims, 15 Drawing Sheets

1 side opening door and 2 front opening doors

One Service door

CONTAINER FILLING SYSTEM FOR RADIOACTIVE MATERIALS

CROSS-REFERENCE TO RELATED APPLICATIONS

The present application claims the benefit of priority to U.S. Provisional Application No. 63/133,966, filed Jan. 5, 2021, the entire contents of which are incorporated herein by reference.

FIELD

The present disclosure relates to systems, apparatuses, and methods for filling capsules and vials with radioactive and/or other types of potentially hazardous materials.

BACKGROUND

A number of scientific uses require relatively small aliquots of radioactive materials. For example, nuclear medicine employs solutions of radioisotopes, such as Technetium-99m, Iodine-123, Iodine-125, Iodine-131, Phosphorous-32, Indium-111, Cobalt-57, and Chromium-51, as radiopharmaceuticals or as radioactive tracers. These radioisotopes typically are measured and dispensed for use. However, for safety reasons, it is highly desirable that the technician responsible for measuring and dispensing radioisotopes be exposed to minimal radioactivity. It is also desirable in some instances that the actual radioisotope doses be empirically determined in terms of radioactivity.

Thus, apparatuses for safely dispensing small volumes of radioactive materials are needed.

SUMMARY

In one aspect, the present disclosure provides systems for filling containers with radioactive and/or other types of potentially hazardous materials. Preferred systems are those that deposit one or more radioactive materials in relatively small containers such as capsules or small vials. Such systems typically comprise a shielding material that substantially defines a chamber and, preferably, substantially blocks radioactivity, a conduit extending from outside to into the chamber, and a unit that is disposed in the chamber proximal to the conduit and is adapted to receive a capsule through the conduit. The systems of the present disclosure can further comprise a syringe, a syringe controller that is disposed in the dispensing chamber and adapted to meter an aliquot from a radioactive stock solution and inject the aliquot into the capsule or a vial; a computer for receiving user's inputs and having a memory that activates the controller. The systems preferably further comprise a tapered guide lid that is positioned over the radioactive stock solution to guide the needle of a syringe.

The present disclosure also provides a container filling system that comprises a dispensing chamber that is made of a shielding material, and that has a first side opening, a second side opening, at least one rod inside the dispensing chamber that vertically extends outside and above the dispensing chamber for manipulating the position of a syringe that is located inside, a chute manipulator extending vertically inside and outside the dispensing chamber for sliding a capsule inside the dispensing chamber, a capsule securing unit having at least one receptacle has a size adapted to tightly receive a capsule that has slid inside the dispensing chamber, and a shielded window for allowing a user of the system to see the syringe and capsule securing unit; a loading chamber that is made of a shielding material, and having a first side opening and second side opening, the second side opening is in communication with the first side opening of the dispensing chamber, the first side opening provides access to a user hand for introducing a material; a sliding door for alternatively closing and opening the first side opening of the dispensing chamber and therefore closing communication with the loading chamber; a door for alternatively closing and opening the second opening of the dispensing chamber; a syringe controller for controlling the syringe; a computer that activates the syringe controller; an entrance tray that moves between an internal position that is completely inside the dispensing chamber and an external position where at least one portion of the entrance tray is in the loading chamber; and an exit tray that moves between an internal position that is completely inside the dispensing chamber and an external position where at least one portion of the exit tray extends outside the second side opening of the dispensing chamber.

The present disclosure also provides a container filling system that comprises a bar code scanner for scanning a bar code that provides information about a radioactive iodine solution, said information includes the volume of the solution, the concentration of radioactive iodine, and the date of calculation of said concentration; and a computer has a memory that calculates the volume of radioactive solution that is needed based on i) the information provided by the bar code, and ii) a required dose input at a specific date.

The present disclosure also provides a waste container that is surrounded by a shielded material and comprises a waste chute for sliding waste material in the waste container, said waste container comprises at least 2 compartments that are upwardly opened, and the waste container can pivot around a vertical axis in order to place one compartment vis-à-vis the duct for receiving the waste material. Preferably, the waste container has a controller for controlling the rotation of the waste container around the axis, wherein a computer causes the controller to rotate the waste container so that one compartment is vis-à-vis the first duct or the first and second ducts during a pre-determined period, which is pre-determined such that, upon one full rotation, a compartment contains waste material that has completely decayed.

The present disclosure also provides a ventilation system for a container filling system that creates a negative pressure in all the chambers of the container filling system, wherein each door of said chambers does not hermitically close. When active, this ventilation system results in a continuous entrance of ambient air into the container filling system. The ventilation system preferably comprises replaceable filters.

The present disclosure also provides a container filling system that has a dispensing chamber equipped with a replaceable floor for ease of decontamination.

The present disclosure also provides a container filling system adapted to manage two different radioisotopes by providing two dispensing chambers, and two loading systems.

The invention is further defined with reference to the following numbered aspects:

Aspect 1. A container filling system comprising:

a. a dispensing chamber that is made of a shielding material, and having:
   i. a first side opening,
   ii. a second side opening, iii. at least one rod inside the dispensing chamber that vertically extends outside and above the dispensing chamber for manipulating the position of a syringe that is located inside, iv. a chute manipulator extending vertically inside and outside the dispensing chamber for sliding a capsule inside the dispensing chamber, v. a capsule securing unit having at least one receptacle has a size adapted to tightly receive a capsule that has slid inside the dispensing chamber, and vi. a shielded window for allowing a user of the system to see the syringe and capsule securing unit;

b. a loading chamber that is made of a shielding material, and having a first side opening and second side opening, the second side opening is in communication with the first side opening of the dispensing chamber, the first side opening provides access to a user hand for introducing a material;

c. a sliding door for alternatively closing and opening the first side opening of the dispensing chamber and therefore closing communication with the loading chamber;

d. a door for alternatively closing and opening the second opening of the dispensing chamber;

e. a syringe controller for controlling the syringe;

f. a computer that activates the syringe controller; and g. a waste container located at a level within the system that is lower than a level at which the dispensing chamber or the loading chamber are located within the system, wherein the waste container is made of or surrounded by a shielded material and comprises a first waste chute interconnecting the dispensing chamber or the loading chamber to the waste container and allowing waste material to slide into the waste container.

Aspect 2. The container filling system of aspect 1, wherein the waste container comprises a second waste chute that interconnects the loading chamber or the dispensing chamber and the waste container for allowing waste material to slide into the waste container.

Aspect 3. The container filling system of aspect 2, wherein the second waste chute merges with the first waste chute.

Aspect 4. The container filling system of any one of aspects 1 to 3, wherein the waste container further comprises at least two compartments that are upwardly opened, wherein the waste container can move in order to place one of the compartments in communication with the first waste chute for receiving the waste material.

Aspect 5. The container filling system of aspect 4, wherein the waste container comprises three compartments.

Aspect 6. The container filling system of aspect 4 or 5, wherein each of said at least two compartments are of equal volume, and comprise a pie shape.

Aspect 7. The container filling system of aspect 4, further comprising a waste container controller for controlling the movement of the waste container, wherein the computer causes the controller to rotate the waste container so that a first one of the compartments remains in communication with the first waste chute during a pre-determined period of time.

Aspect 8. The container filling system of aspect 7, wherein the pre-determined period of time is such that, upon one full rotation of the waste container, the first one of the compartments contains waste material that has completely decayed.

Aspect 9. The container filling system of any one of aspects 1-8, wherein the first waste chute comprises a blockage sensor that is able to detect the presence of any object blocking the sliding of a waste material through the first waste chute.

Aspect 10. The container filling system of aspect 2, wherein the second waste chute comprises a blockage sensor that is able to detect the presence of any object blocking the sliding of a waste material through the second waste chute.

Aspect 11. The container filling system of any one of aspects 1-10, wherein the waste container comprises level sensor that is located inside the waste container for detecting a level of waste material within said waste container.

Aspect 12. The container filling system of aspect 9, wherein the blockage sensor is in communication with the computer, and upon receiving information from the blockage sensor that an object is blocking the sliding of a waste material within the first waste chute, the computer displays the information on a user interface.

Aspect 13. The container filling system of aspect 10, wherein the blockage sensor is in communication with the computer, and upon receiving information from the blockage sensor that an object is blocking the sliding of a waste material in the second waste chute, the computer displays the information on a user interface.

Aspect 14. The container filling system of aspect 11, wherein the level sensor is in communication with the computer, and upon receiving information from the level sensor that the level of waste material has reached a pre-determined level, the computer displays said information on a user interface.

Aspect 15. The container filling system of any one of aspects 1 to 14, further comprising a bar code scanner for scanning a bar code that provides information about a radioactive solution, said information includes one or more of the volume of the radioactive solution, the concentration of radioactive compound in the radioactive solution, and the date of calculation of said concentration of radioactive compound; wherein the computer has a memory that calculates a required dose volume of radioactive solution based on i) the information provided by the bar code, and ii) a required dose input corresponding to a required patient dose at a specific date.

Aspect 16. The container filling system of aspect 15, wherein the computer activates the syringe controller for drawing said required dose volume of radioactive solution and injecting into a capsule.

Aspect 17. The container filling system of aspect 16, further comprising a user interface for receiving said required dose input.

Aspect 18. The container filling system of aspect 15, wherein the computer activates the syringe controller for drawing said required dose volume of radioactive solution that is needed and injecting said required dose volume into a vial, and calculating the volume of non-radioactive solution that is needed to prepare the required dose volume in said vial.

Aspect 19. The container filling system of aspect 18, further comprising a user interface for receiving said required dose input and said required volume input.

Aspect 20. The container filling system of any one of aspects 1-19, further comprising an entrance tray that moves between an internal position that is inside the dispensing chamber and an external position where at least one portion of the entrance tray extends inside the loading chamber.

Aspect 21. The container filling system of aspect 20, wherein the material that is introduced in the loading chamber includes a vial containing a radioactive solution, a vial containing a non-radioactive solution, or an empty vial.

Aspect 22. The container filling system of any one of aspects 1-21, further comprising an exit tray that moves between an internal position that is inside the dispensing chamber and an external position where at least one portion of the exit tray extends outside the second side opening of the dispensing chamber.

Aspect 23. The container filling system of any one of aspects 1-22, further comprising a door for alternately closing and opening the first side opening of the loading chamber.

Aspect 24. The container filling system of any one of aspects 1-23, further comprising a storage chamber that is made of a shielding material for storing radioactive material.

Aspect 25. The container filling system any one of aspects 1-24, further comprising a ventilation system that creates a negative pressure in the dispensing chamber, the loading chamber, and the waste container of the container filling system, wherein each door of the container filling system does not hermitically close so that ambient air enters into the container filling system when the ventilation system is active.

Aspect 26. The container filling system of aspect 25, further comprising a ventilation system that creates a negative pressure in the dispensing chamber, the loading chamber, the waste container and the storage chamber of the container filling system, wherein each door of the container filling system does not hermitically close so that ambient air enters into the container filling system when the ventilation system is active.

Aspect 27. The container filling system of aspect 25 or 26, wherein the ventilation system comprises multiple ventilation ducts and each duct has at least one disposable filter.

Aspect 28. The container filling system of any one of aspects 1 to 27, wherein the computer is connected to a network for remote access.

Aspect 29. The container filling system of any one of aspects 1-28, wherein the dispensing chamber has a floor that is accessible through an underside of the dispensing chamber and can be detached from the dispensing chamber for replacement.

Aspect 30. The container filling system of any one of aspects 1-29, further comprising a capper manipulator that extends vertically inside and outside the dispensing chamber for engaging a screw cap of a vial and alternately remove or place the screw cap on the vial.

Aspect 31. The container filling system of any one of aspects 1-30, wherein the computer has a memory that causes the syringe controller to manipulate the syringe for a rinsing cycle with a non-radioactive solution.

Aspect 32. The container filling system of any one of aspects 20, wherein the loading chamber further comprises a rotary platform that allows a heavy material to be placed on the rotary platform in a position proximate to the first side opening of the loading chamber, and to be moved in proximate to the entrance tray in the external position by rotation of the rotary platform.

Aspect 33. The container filling system of any one of aspects 1-32, wherein the dispensing chamber represents a first dispensing chamber, the loading chamber represents a first loading chamber, and the container filling system further comprises:

a. a second dispensing chamber that is substantially identical to the first dispensing chamber; and
b. a second loading chamber that is substantially identical to the first loading chamber;

wherein the computer activates the syringe controller of the first dispensing chamber and the syringe controller of the second dispensing system.

Aspect 34. The container filling system of any one of aspects 1-33, further comprising a dose calibrator in communication with the dispensing chamber via a passage, a carrier for transporting a container from the dispensing chamber to the dose calibrator through said passage, wherein the carrier allows the dose calibrator to detect radioactivity inside the container, and a carrier controller for controlling the movement of the carrier during transportation.

Aspect 35. The container filling system of aspect 34, wherein the passage is located in a floor of the dispensing chamber and is substantially vertical.

BRIEF DESCRIPTION OF THE DRAWINGS

The numerous objects and advantages of the present disclosure may be better understood by those skilled in the art by reference to the accompanying non-scale figures, which are provided by way of example and are not intended to limit the disclosure.

DETAILED DESCRIPTION

The present disclosure provides systems for filling containers with radioactive and/or other types of potentially hazardous materials. Potentially hazardous materials according to the disclosure are those that present or are suspected to present one or more types of health risks to a human who is exposed to the material. Representative materials according to the disclosure include chemicals and biological agents including but not limited to poisons, toxins, mutagens, and teratogens. Materials of particular interest with respect to the present disclosure are those that emit one or more radioactive species.

Containers according to the disclosure are vessels that can contain or substantially contain a potentially hazardous material of interest. Vessels that contain the material include sufficient structure to surround it; vessels that substantially contain the material bound it with sufficient structure to restrict its movement in one or more directions. Containers of particular interest with respect to the present disclosure are those (such as capsules, tubes, ampoules, and vials) that are relatively small (i.e., have a volume less than about 10 mL, more preferably less than about 1 mL. Suitable capsules are well known to those skilled in radiopharmaceutical preparations, and include those commercially available from Capsugel, Greenwood, S.C., USA.

The systems of the disclosure include a shielding material that substantially defines a chamber. Any of a wide variety of shield materials can be used that provide an effective barrier to the potentially hazardous material and are either capable of forming a substantially closed surface shape that substantially defines a chamber or being disposed upon a substantially closed-surface shape that substantially defines chamber. Thus, a shielding material that substantially defines a chamber need not do so alone. Representative shielding materials include metals, alloys, and/or polymers; shield materials of particular interest are those (such as lead, tungsten, and other suitable metals and alloys) that provide an effective barrier to radioactive species. Preferably, the shielding material is at least as effective as lead. Chambers according to the disclosure can have virtually any shape, although substantially rectangular chambers and substantially cylindrical chambers are probably most common.

Figure 1:
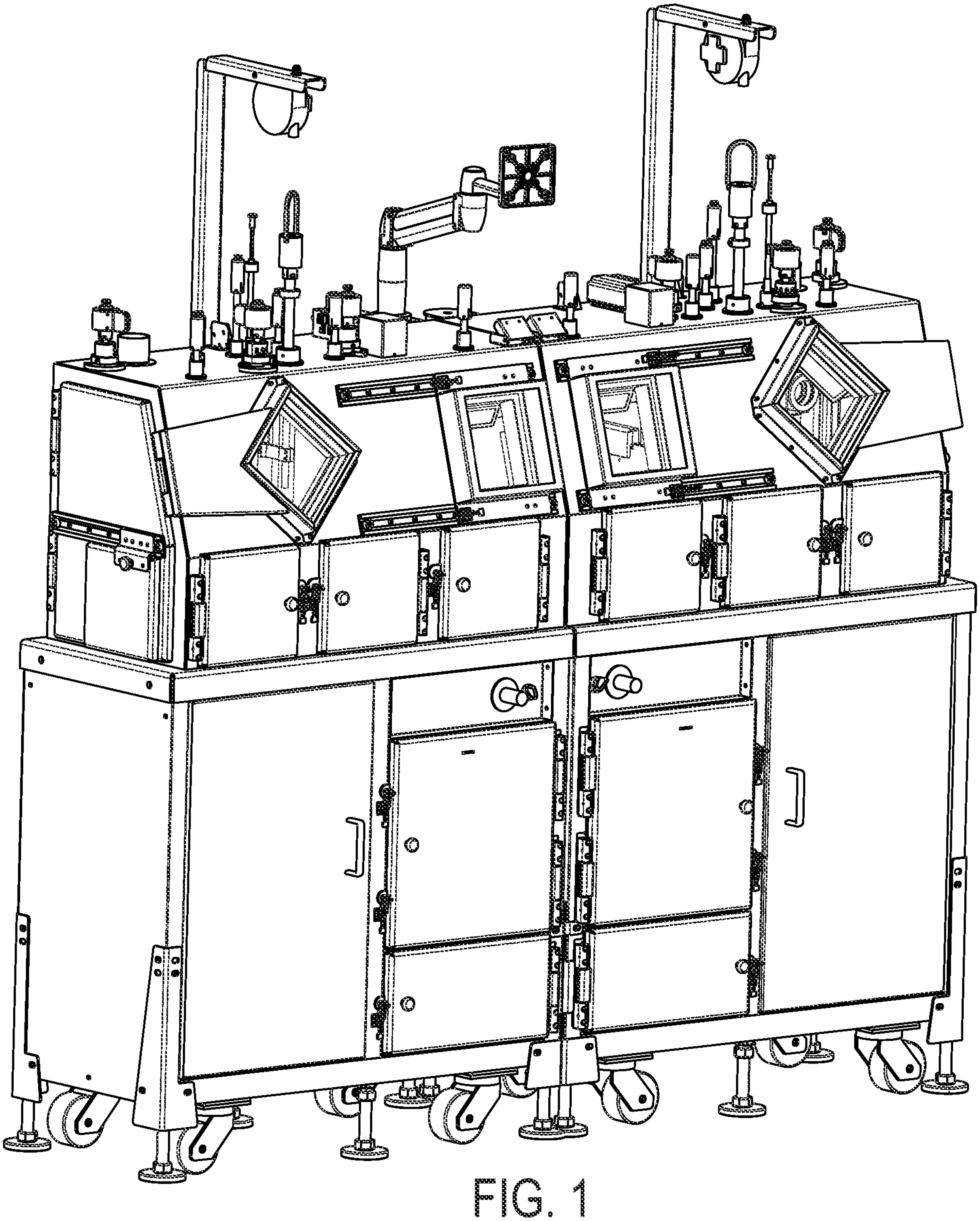
FIG. 1 is a perspective view of an embodiment of the container filling system that comprises two loading chambers and two dispensing chambers.

FIG. 1 shows an embodiment of the container filling system of the present disclosure that comprises two dispensing chambers, two loading chambers, and two waste containers (not shown). This embodiment is suitable for dispensing two different radioisotopes, for example I-131 and I-123, and preventing any contamination of one radioisotope when dispensing another radioisotope. Advantageously, the pre-determined period of rotation (discussed below) of the waste container is adapted for the specific decay of each radioisotope respectively.

Figure 2:
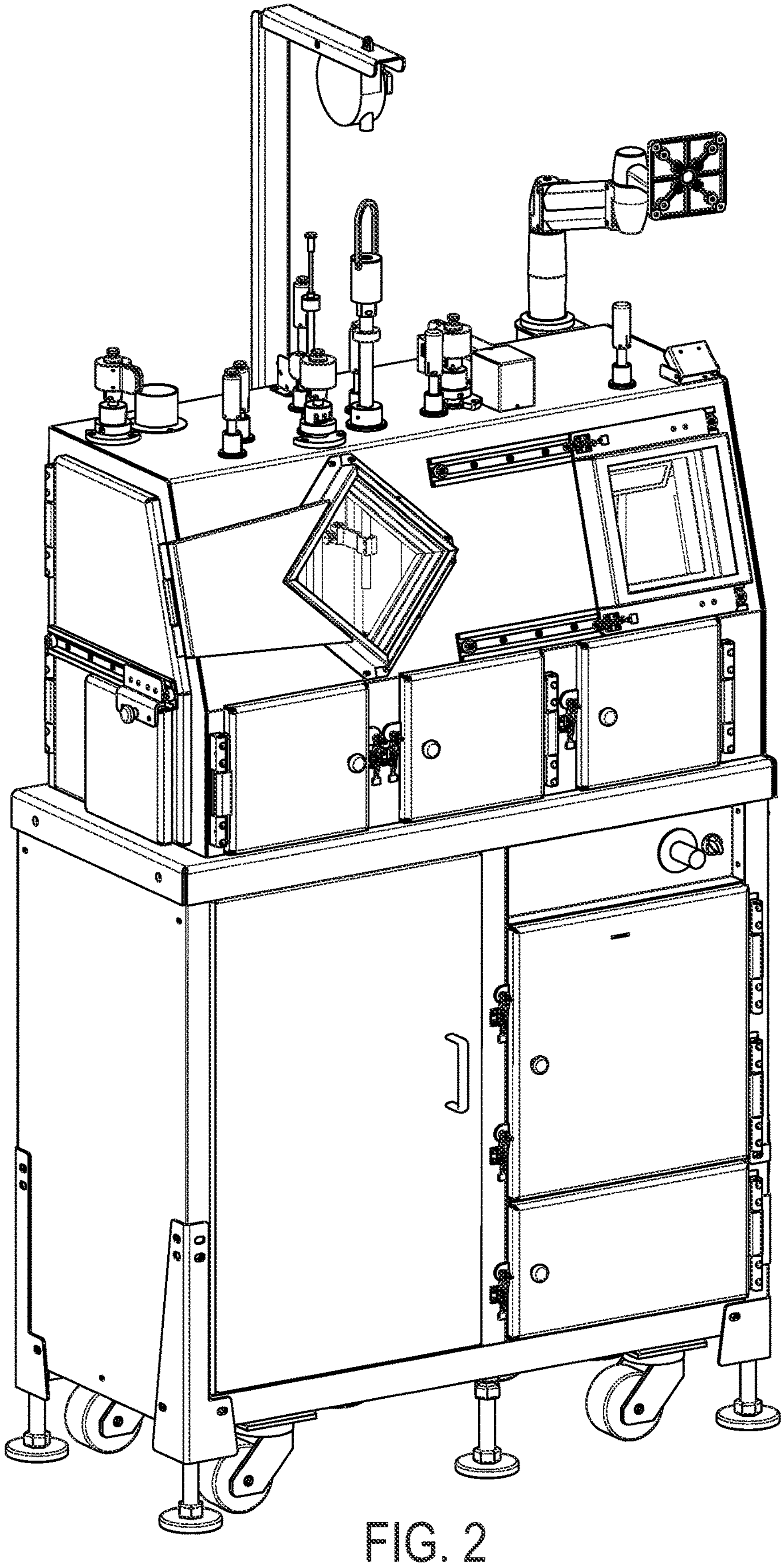
FIG. 2 is a perspective view of an embodiment of the container filling system that comprises one loading chamber and one dispensing chamber.

FIG. 2 shows an embodiment of the container filling system of the present disclosure that comprises one dispensing chamber, and one loading chamber. It is preferable that only one radioisotope is dispensed in this embodiment so as to avoid cross-contamination. Otherwise, it is recommended to perform an adequate decontamination or to allow an appropriate decay period prior to dispensing another radioisotope in the same system.

Figure 3:
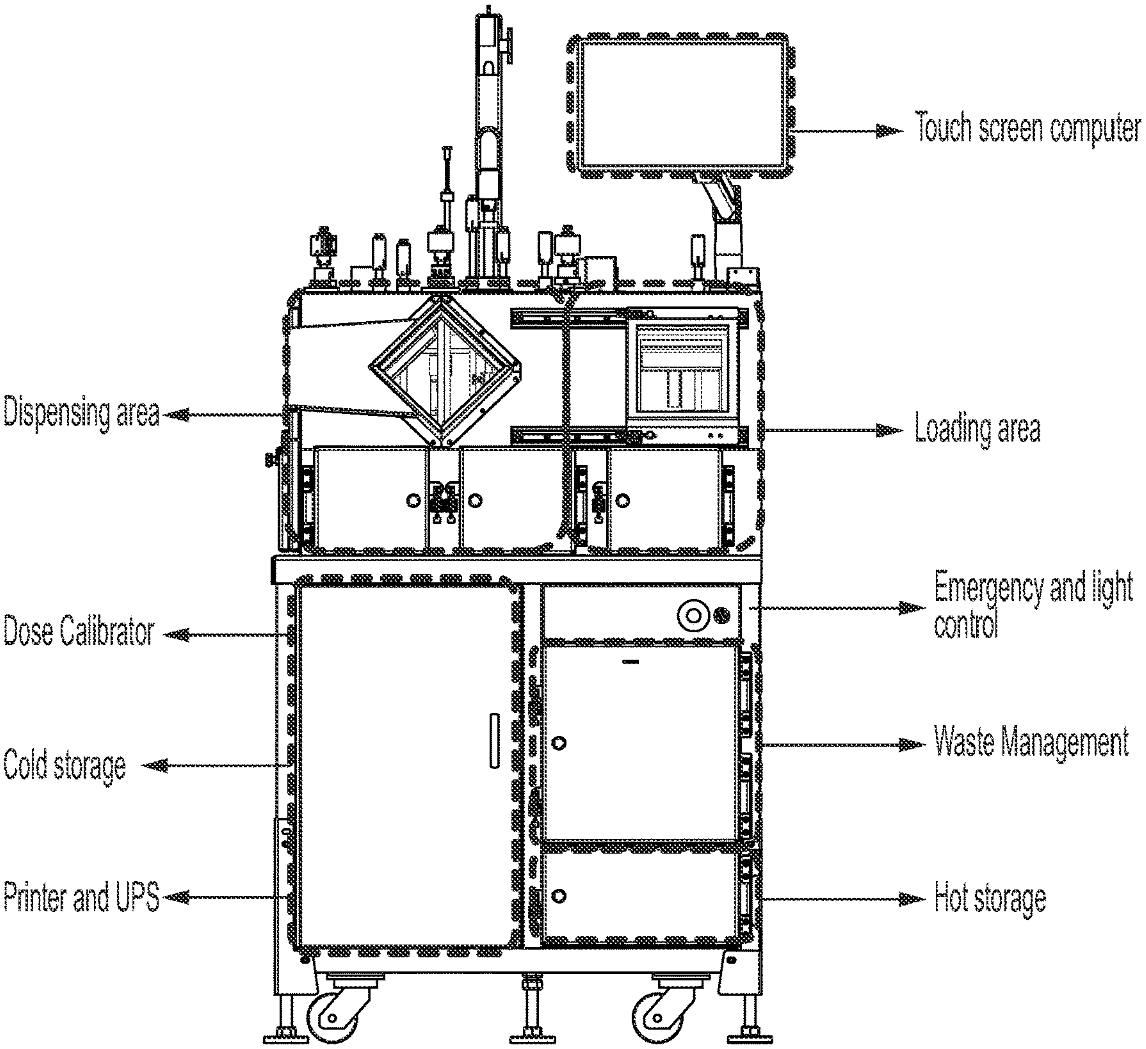
FIG. 3 is a schema of the embodiment of FIG. 2 that represents the various areas.

FIG. 3 shows distinctive areas of the embodiment of the disclosure represented in FIG. 2. More particularly, these areas include a touch screen computer area that comprises a user touch screen or a user touch screen integrated to a computer; a loading area comprising a loading chamber; a dispensing area comprising a dispensing chamber; a waste management area comprising a waste container; a hot storage area comprising a storage chamber for storing radioactive (also so called "hot") material; and another area that comprises cold items such as the dose calibrator (optional item to the system), non-radioactive (also called "cold") storage for non-radioactive material including spare needles, syringes, gloves, capsules, vials, and the like, and another location that preferably used to receive a printer and optionally a computer for embodiment where the computer is not integrated in the touch screen. FIG. 3 also shows an emergency control for interrupting suddenly the dispensing of radioactive material if needed, and a light control for controlling the lights inside the chambers.

Figure 4:
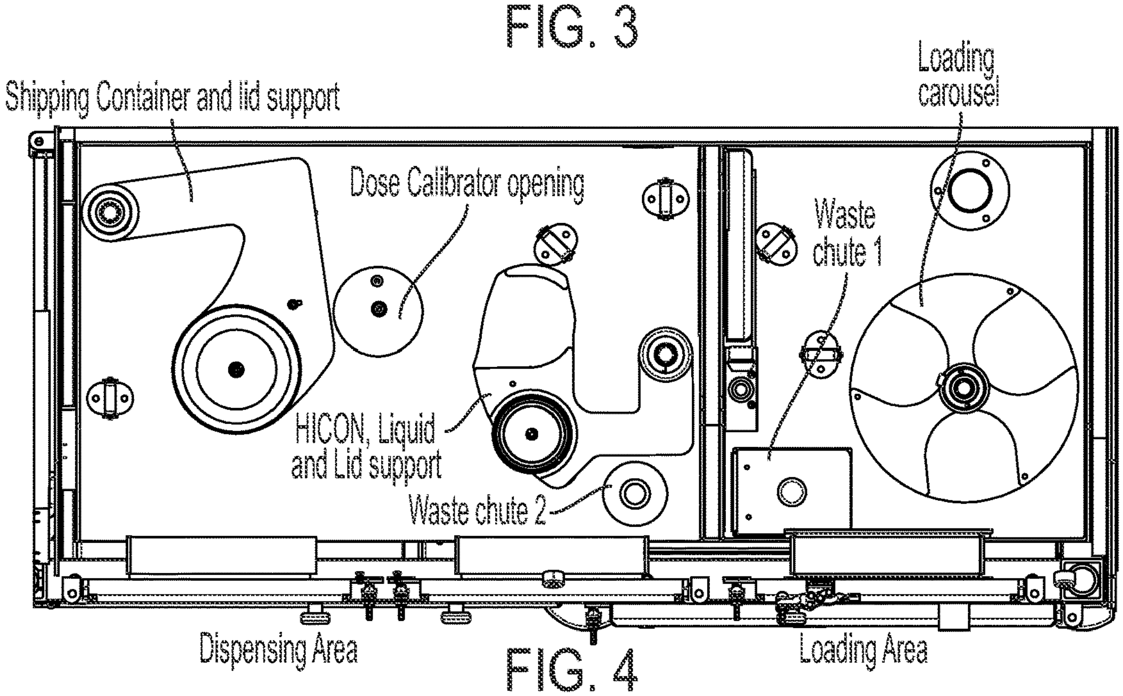
FIG. 4 is a top view of a cross-section of a dispensing chamber and the loading chamber showing a rotary platform, an entrance tray, an exit tray and the floors of both chambers.
Figure 5:
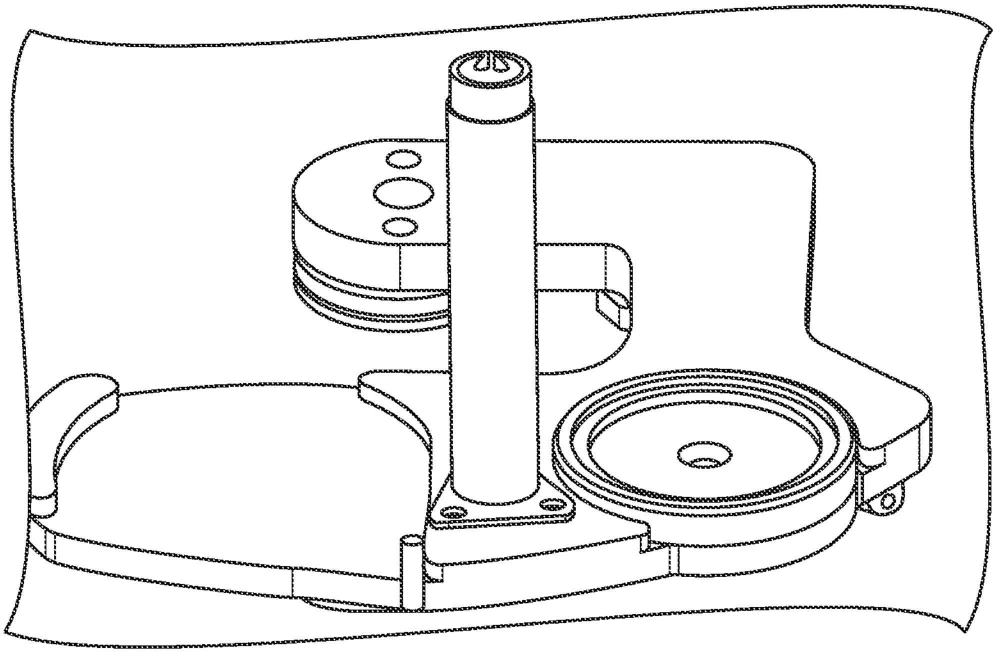
FIG. 5 is a perspective view of an embodiment of an entrance tray.

FIGS. 4 and 5 show the entrance tray for entry of material in the dispensing chamber including a radioactive stock solution such as HICON® solution, and any other solution or liquid. Advantageously, the entrance tray further comprises a lid support for placing a lid of a vial. Said lid support is helpful for a capper manipulator to grab the lid prior to close a vial with said lid. In the embodiment shown in FIGS. 4 and 5, the entrance tray pivots around a vertical axis for moving between an internal position that is completely inside the dispensing chamber and an external position where at least one portion of the entrance tray is in the loading chamber. Other movements of the entrance tray are encompassed by the present disclosure such as translation or the like. The embodiment of FIG. 4 also shows a rotary platform (called loading carousel) in the loading area. With this rotary platform, a user does not need to enter a heavy item far inside the loading chamber, for the security of the user. Advantageously, a user can place a heavy item closely to the first side opening of the loading chamber, and by rotating the rotary platform the heavy item is brought closer to the entrance tray. Then, the user may simply push the heavy item from the platform to the tray without raising it. This feature is particularly useful for radioactive stock solution that are enclosed into a shielded container comprising a thick wall of shielding material such as lead, tungsten, alloy and combination thereof. Usually, shielding materials are significantly heavy. Preferably, the rotary platform has several recess locations for guiding a shielded container that is slid on the platform.

Figure 6:
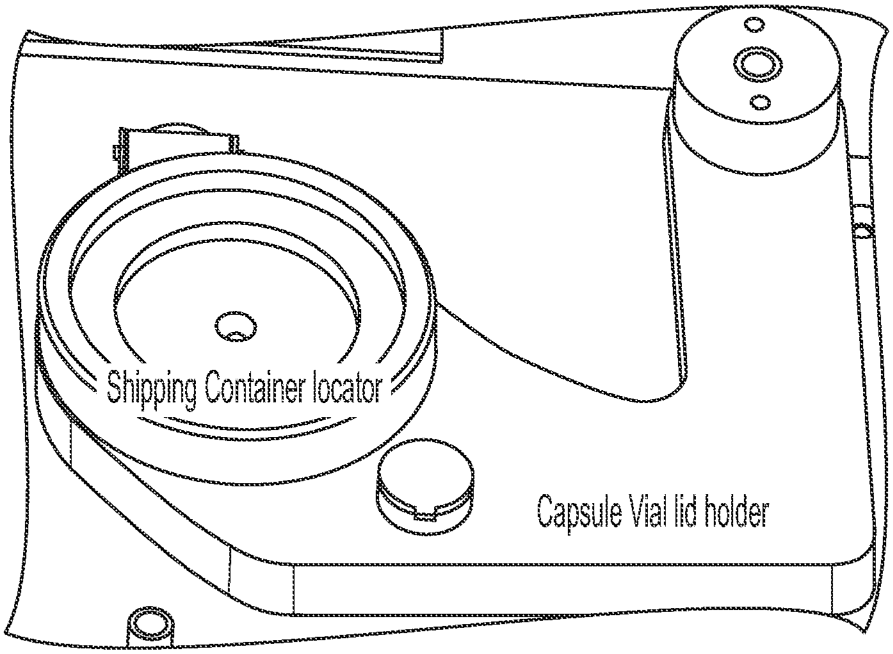
FIG. 6 is a perspective view of an embodiment of an exit tray.

FIGS. 4 and 6 also show an exit tray for exiting of material out of the dispensing chamber. In an embodiment, the exit tray moves between an internal position that is completely inside the dispensing chamber (as shown in FIG. 4) and an external position where at least one portion of the exit tray extends outside the second side opening of the dispensing chamber. In the internal position, the door of the second side opening of the dispensing chamber is preferably closed so as to allow dispensing in an environment that contains radioactive radiation inside the dispensing chamber for user's security. In the external position, the exit tray can carry outside the dispensing chamber a vial containing a prepared diluted radioactive solution or radioactive filled capsules so as to enable the user to take the prepared radioactive material without entering user's hand into the dispensing chamber and therefore avoiding unnecessary exposition radioactive radiation. In this embodiment, the exit tray moves pivots around a vertical axis; however, other movements are encompassed by the present disclosure such as translation or else. FIG. 6 also shows a capsule vial lid holder to place a lid during dispensing the radioactive solution. Advantageously, the capsule vial lid holder on the exit tray exposes the lid in such a way that it can be easily grabbed by a capper manipulator for closing the vial. FIG. 6 preferably comprises a recess for receiving a shipping container. Said shipping container is preferably a shielded container comprising a thick wall of shielding material such as lead, tungsten, alloy and combination thereof and the vial containing the prepared radioactive material is placed inside the shielded container by means of a transfer manipulator (shown in FIG. 19).

FIG. 4 also shows a dose calibrator opening whereby a vial support can lower a vial containing a prepared radioactive material into a dose calibrator located underneath, measure the amount of radioactivity that has been dispensed with the dose calibrator, and bring the vial back into the dispensing chamber. This allows a user to safely measure the radioactive dose that was dispensed prior to exit it from the shielding dispensing chamber.

Figure 7:
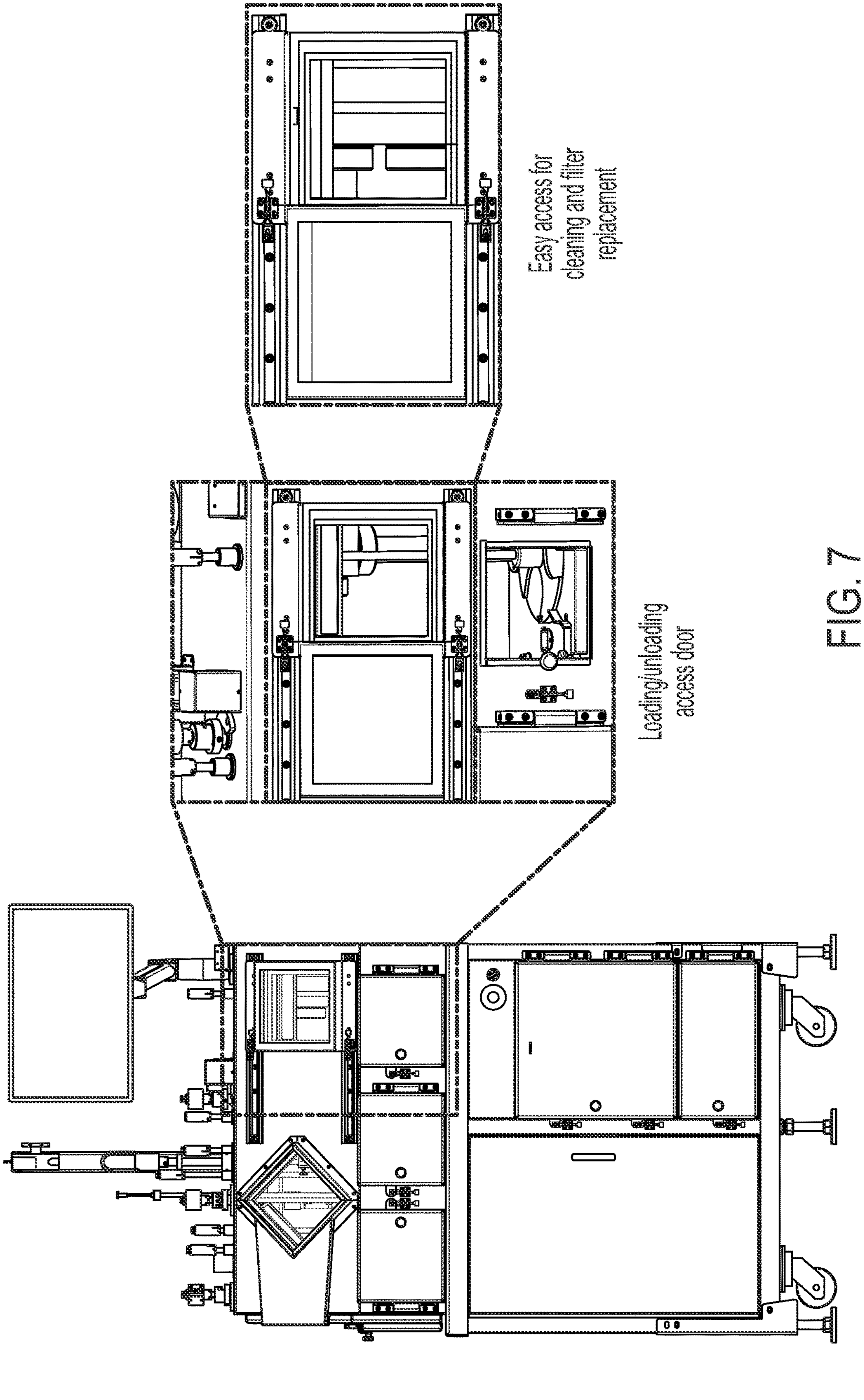
FIG. 7 is an exploded view of the loading area.

FIG. 7 shows an embodiment of the loading chamber wherein the loading chamber has a window above the first side opening, which can be advantageously opened to ease user's access to the loading chamber for various purposes such as for cleaning, decontamination and replacing a filter of the ventilation system that is located in this chamber. Said window is preferably made of a transparent shielded material. The window may be formed from any substantially transparent, radiation-shielding material, such as leaded glass, in any of the many known configurations. For example, the window may be a single layer of leaded glass or a plurality of layers having an inert gas or a shielding oil disposed between them.

Figure 8:
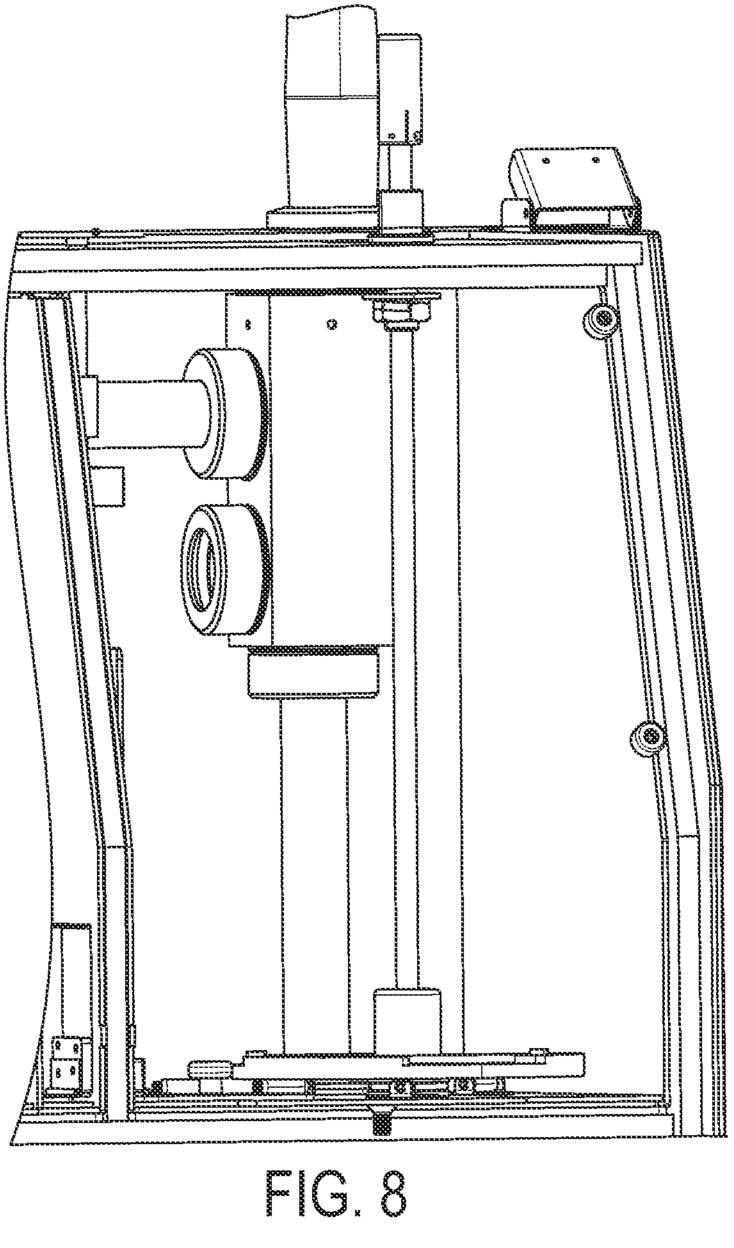
FIG. 8 is a perspective view of a part of the ventilation system in the loading chamber.

FIG. 8 is another view of the embodiment of the loading chamber shown in FIG. 7. More particularly, FIG. 8 shows part of the ventilation system including a filter and a portion of a duct in direction of the dispensing chamber.

Figure 10:
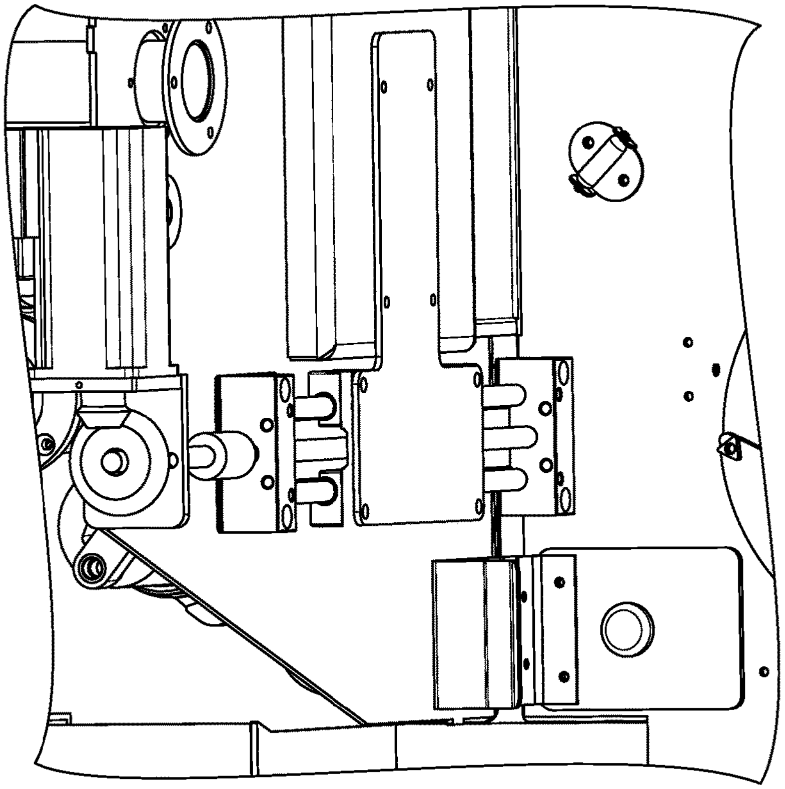
FIG. 10 is another perspective view of the elements inside the loading chamber where the door between the loading chamber and the dispensing chamber is closed.
Figure 9:
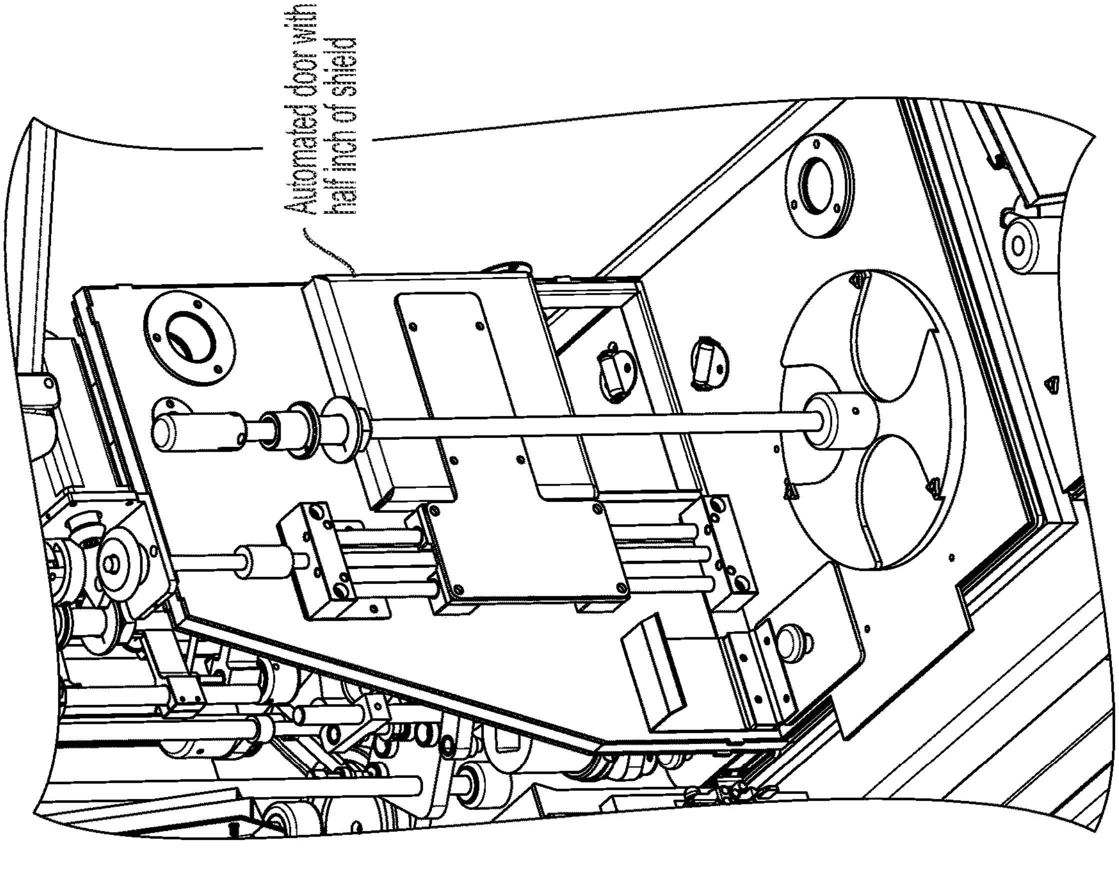
FIG. 9 is a perspective view of the elements inside the loading chamber.

Between the dispensing chamber and the loading chamber a door is provided for minimizing radiation outside the system. Preferably said door is a sliding door. FIG. 9 shows an embodiment where said sliding door is raised above the second side opening of the loading chamber for allowing communication with the dispensing chamber. FIG. 10 shows the same embodiment where the sliding door is down and closes the second side opening of the loading chamber. Movement of the sliding can be automated via a controller or manually driven. In other embodiments, the sliding door moves sideways or pivot around a horizontal axis.

Figure 11:
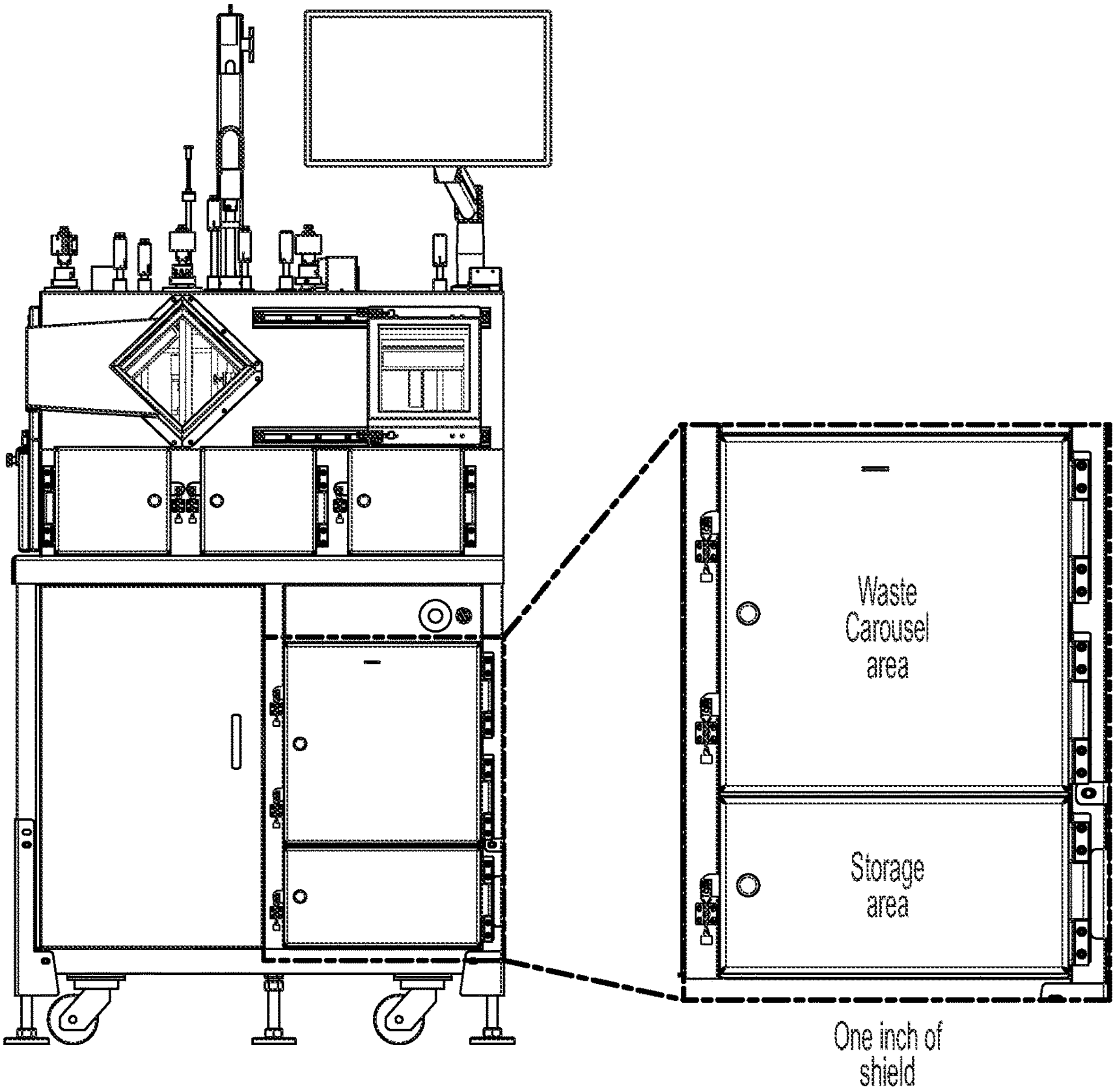
FIG. 11 is an exploded view of an embodiment of the hot area that comprises a waste area and a storage area.

FIG. 11 shows an embodiment of the container filling system that has a waste carousel area and a storage area for storing radioactive material. These areas necessitate to be shielded and in this embodiment, the shielding is provided by the door of the waste chamber and the door of the storage chamber. Alternatively, the storage chamber can be a drawer where the front panel of the drawer is made of a shielded material. Preferably, shielded doors of the waste chamber and storage chamber is made of one inch of shielding material. In this embodiment, the casing of the system below the dispensing and loading chambers is also sufficiently shielded in order to prevent any radiation from being emitted beside the doors of the waste and storage chambers.

Figure 12:
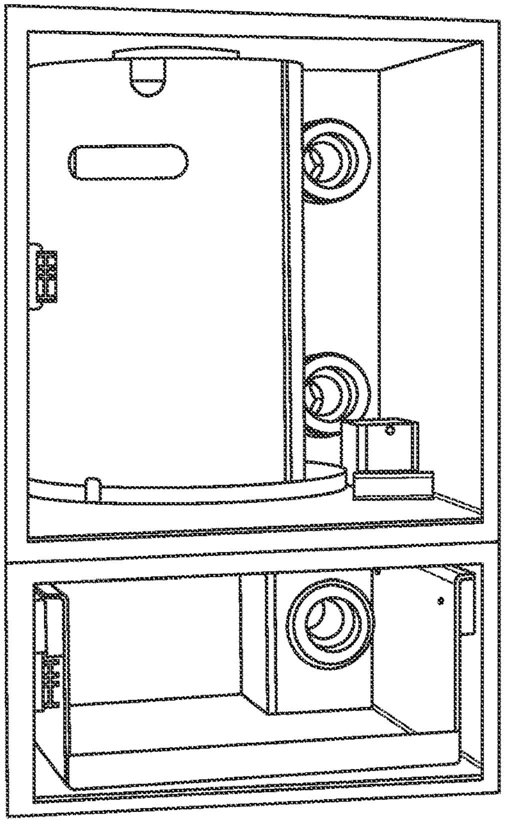
FIG. 12 is an internal view of the hot area of FIG. 11.
Figure 13:
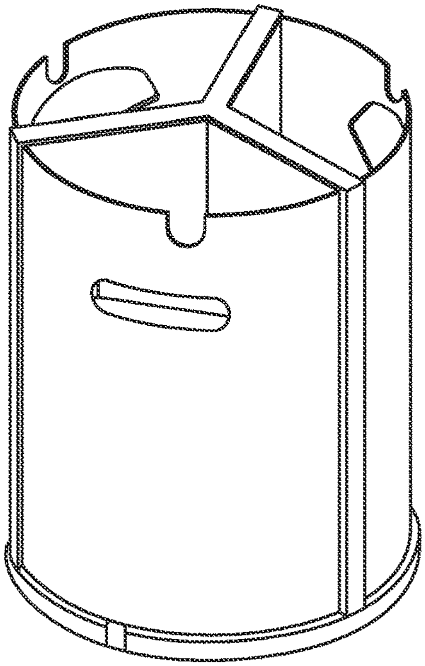
FIG. 13 is a perspective view of an embodiment of the waste container.

FIG. 12 provides a view inside the waste chamber showing an embodiment of the waste container having 12.9 liters of capacity and is separated into 3 compartments (as shown in FIG. 13). Advantageously, the waste container located a level that is lower than a level of the dispensing chamber and a level of the loading chamber, so that the waste material can be easily dropped into a waste chute from the dispensing chamber and/or from the loading chamber for sliding into the waste container. In an embodiment, only one waste chute is provided and connects the waste container with either the loading chamber or the dispensing chamber. In other embodiments, two waste chutes are provided and connects the waste container with both the loading chamber and the dispensing chamber. Both waste chutes can be totally independent or can be merged together in a Y shape. The Y-shaped waste chutes are advantageously more compacted. Since the purpose of the waste container is to manage radioactive waste, it has to be shielded. The waste container can be either shielded by being made of a shielded material or it can be enclosed into a shielded chamber as shown in FIG. 12. The waste container comprises at least 2 compartments that are upwardly opened. Various arrangement of the compartments can be embodied by the present disclosure, including without limitation, in a row or in a pie. When the compartments have a pie arrangement as illustrated in FIG. 13, the waste container can pivot around a vertical axis in order to place one compartment vis-à-vis the first waste chute or the first and second waste chutes for receiving the waste material. In a preferred embodiment illustrated in FIG. 13, the waste container comprises 3 compartments of equal volume. In an embodiment, the compartments have a pie arrangement, a waste container controller is designed for controlling the rotation of the waste container around a vertical axis, and the computer causes the controller to rotate the waste container so that one compartment is vis-à-vis the waste chute(s) during a pre-determined period. This period is preferably pre-determined such that, upon one full rotation, a compartment contains waste material that has completely decayed. Obviously, this period is advantageously determined based on the natural decay of the radioisotope that is dispensed in the system. In preferred embodiments, the waste container has three compartments and the pre-determined period is one third or one half of the normal time for a radioisotope decay. When one compartment has made a complete cycle, the user can dispose the waste materials in the same manner that non-radioactive materials are disposed. Preferably, the computer displays instructions to the user to empty a waste compartment once the materials inside has completely decayed or once a complete cycle was performed. Each compartment is preferably removable and cleanable.

In an embodiment, the first waste chute comprises a blockage sensor that is able to detect the presence of an object that blocks the sliding of a waste material in the first waste chute; and/or the second waste chute comprises a blockage sensor that is able to detect the presence of an object that blocks the sliding of a waste material in the second waste chute; and/or the waste container comprises level sensor that is located inside the waste container for detecting the level of waste material in said waste container. Each of the sensors is preferably an infrared sensor. In a preferred embodiment, each of the sensors is in communication with the computer of the container filing system. Upon receiving information from the blockage sensor of the presence of an object that blocks the sliding of a waste material in the first or second waste chute, the computer displays the information on a user interface. Upon receiving information from the level sensor that the level of waste material has reached a pre-determined level in the waste container, the computer displays this information on a user interface.

Figure 14:
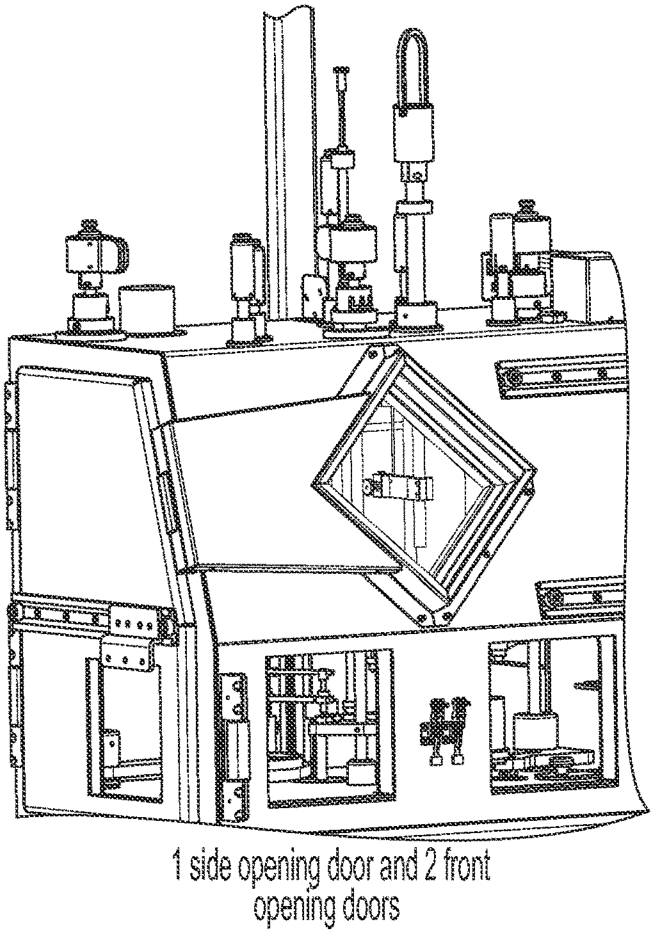
FIG. 14 is a perspective view of an embodiment of a dispensing chamber.
Figure 15:
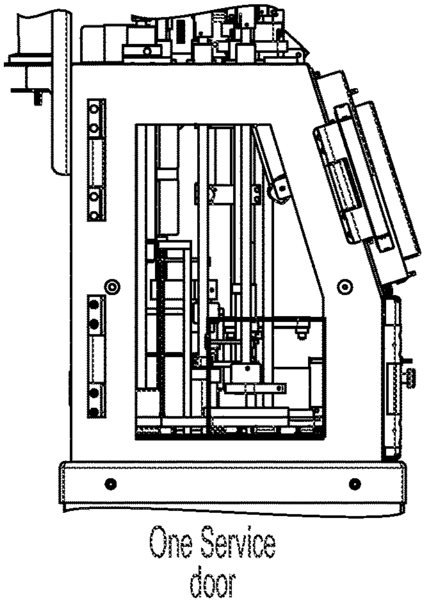
FIG. 15 is a side view of an embodiment of a dispensing chamber that has an opened service door.

In an embodiment depicted in FIG. 14, the dispensing chamber has two opening doors in a front side of the chamber in addition of said second side opening that is exposed on the left side of the chamber. The two opening doors on the front can be used to offer an increased access for cleaning or maintenance. In an embodiment depicted in FIG. 15, said second side opening is located in a service door that provides a large access when opened. Opening this service door gives access to cleaning and maintenance including removal and replacement the ventilation filters in the dispensing chamber.

Figure 16:
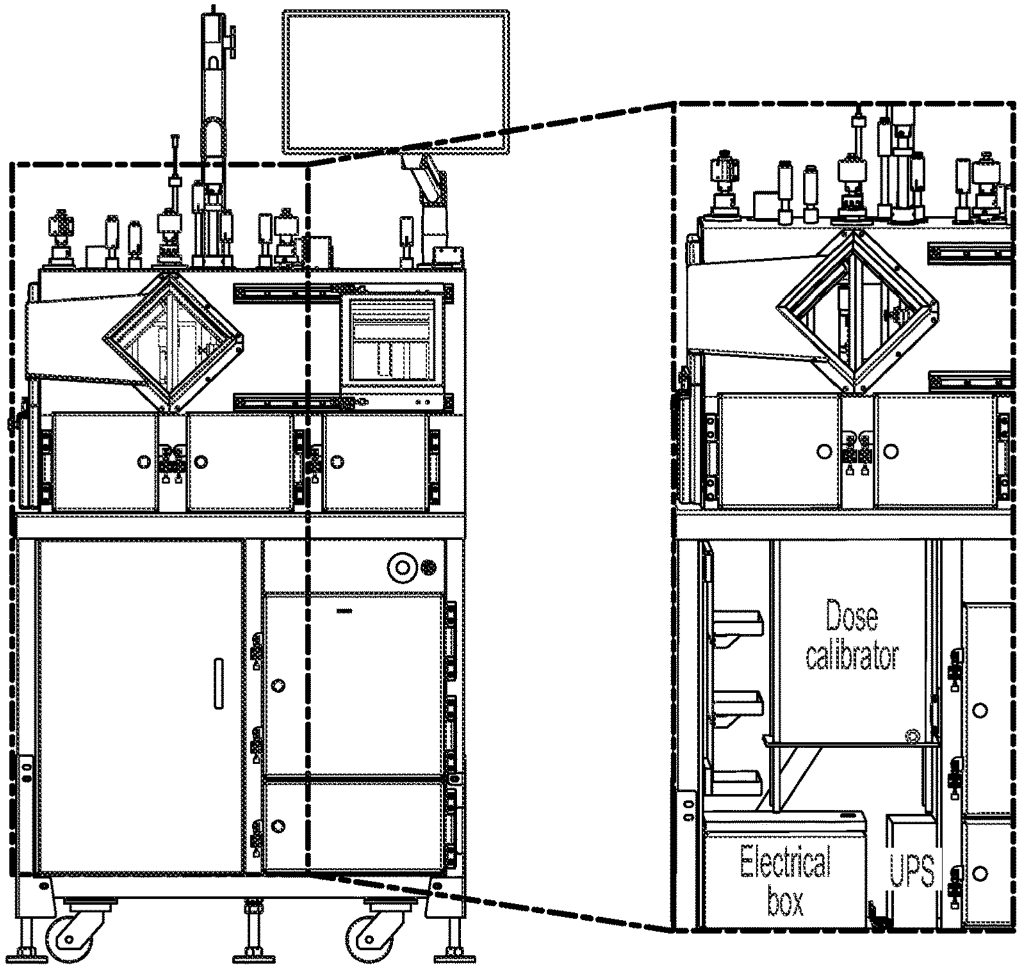
FIG. 16 is an exploded view of a dispensing chamber and a cold area.

In an embodiment of the present disclosure, the container filling system further comprises a dose calibrator. Advantageously, the dose calibrator can be located underneath the dispensing chamber as illustrated in FIG. 16. In this arrangement, the radioactivity of a vial containing one or more dispensed doses can be measured can be lowered into the dose calibrator by a passage arranged in the floor of the dispensing chamber. This passage is identified "dose calibrator opening" in FIG. 4. In an embodiment, the container filing system comprises a dose calibrator that is in communication with the dispensing chamber via a passage, and a carrier for transporting a container from the dispensing chamber to the dose calibrator through said passage. The carrier is preferably such that it allows the dose calibrator to detect the radioactivity inside the container without the need to take the container out from the carrier. In an embodiment, a carrier controller is provided for controlling the transporting movement of the carrier through the passage from the dispensing chamber to the dose calibrator. In a first embodiment, the dose calibrator is located underneath the dispensing chamber. In a second embodiment, the dose calibrator is located behind the dispensing chamber. In the first embodiment, the passage is made in the floor of the dispensing chamber and is substantially vertical. In the second embodiment, the passage is made in the rear side of the dispensing chamber and is substantially horizontal.

Figure 17:
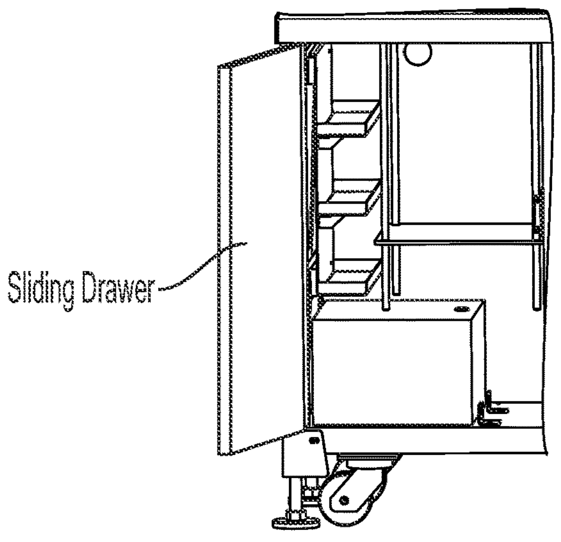
FIG. 17 is a perspective view of a cold area having its door opened.

Furthermore, FIGS. 16 and 17 show that the area below the dispensing chamber can further comprises an electrical box for the electric alimentation of the system. Optionally, the system of the present disclosure may further comprise an uninterruptible power supply (UPS) to power the system in the event of a power failure. Optionally, the area below the dispensing chamber may further comprise a storage area. In the embodiment shown in FIG. 17, the storage area is a sliding drawer with 3 shelves for storing clean filters, user's gloves, new needles, or any other non-radioactive supply.

Figure 18:
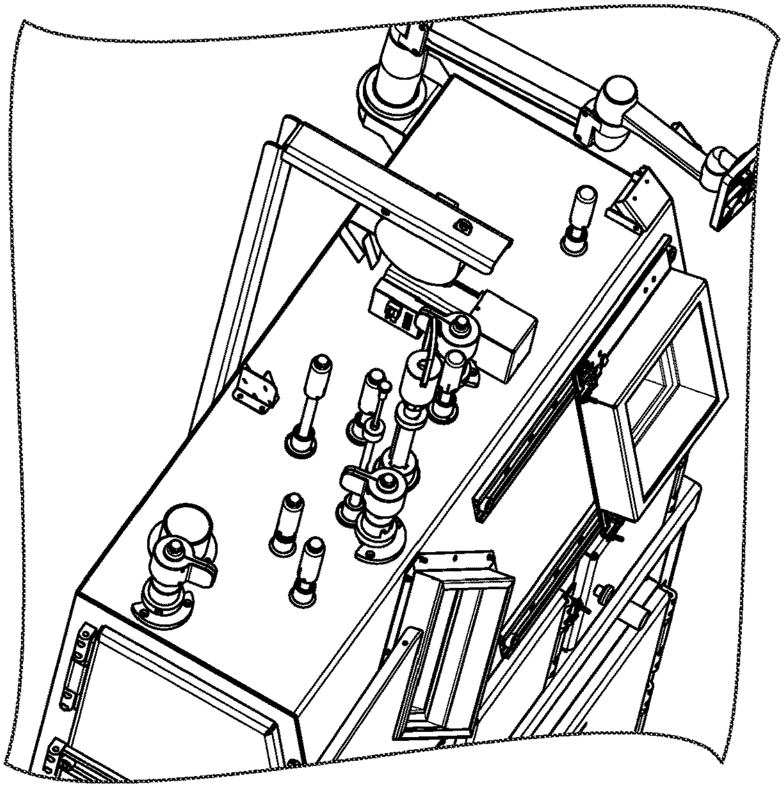
FIG. 18 is a top perspective view of the embodiment of the system of FIG. 2.
Figure 19:
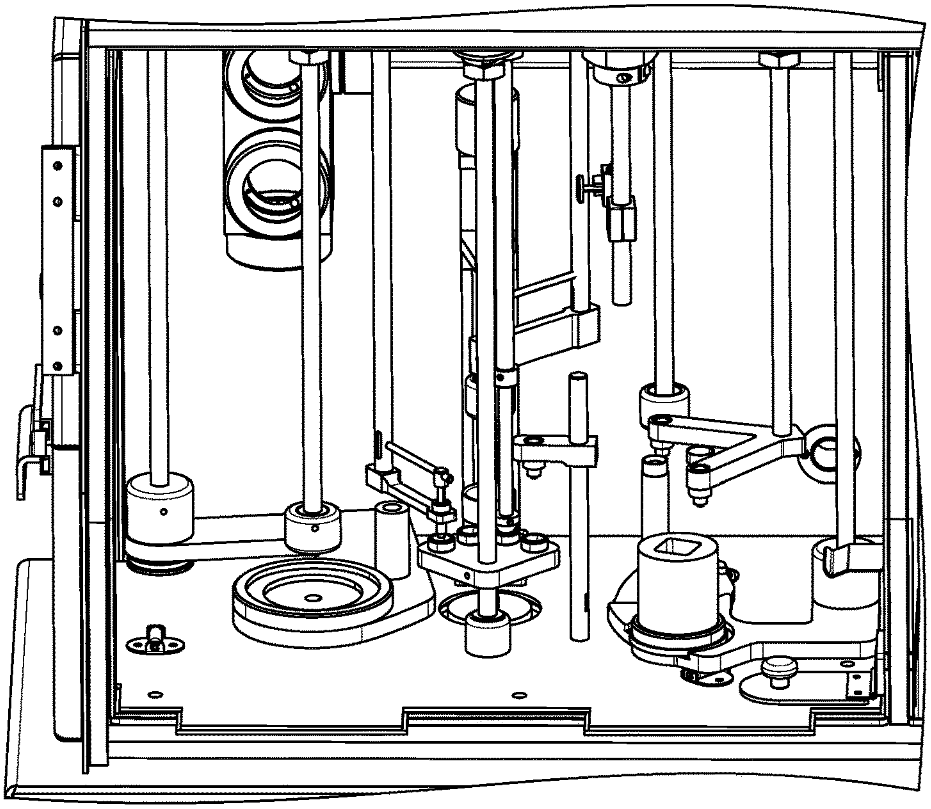
FIG. 19 is a perspective view of the inside of a dispensing chamber showing various manipulators and trays.

FIGS. 18 and 19 show a capsule securing unit and a chute manipulator above, an entrance tray holding a shielded container and a capsule vial lid holder, a syringe controller (syringe is not illustrated), a capper manipulator, an exit tray, a transfer manipulator for transferring a capsule into a vial, a vial manipulator for transferring a vial location, and two filters of the ventilation system. In one embodiment, the transfer manipulator operates by creating a snug fit between receiver and the capsule. The capsule may be released applying a force to the capsule sufficient to overcome the snug fit.

Figure 20:
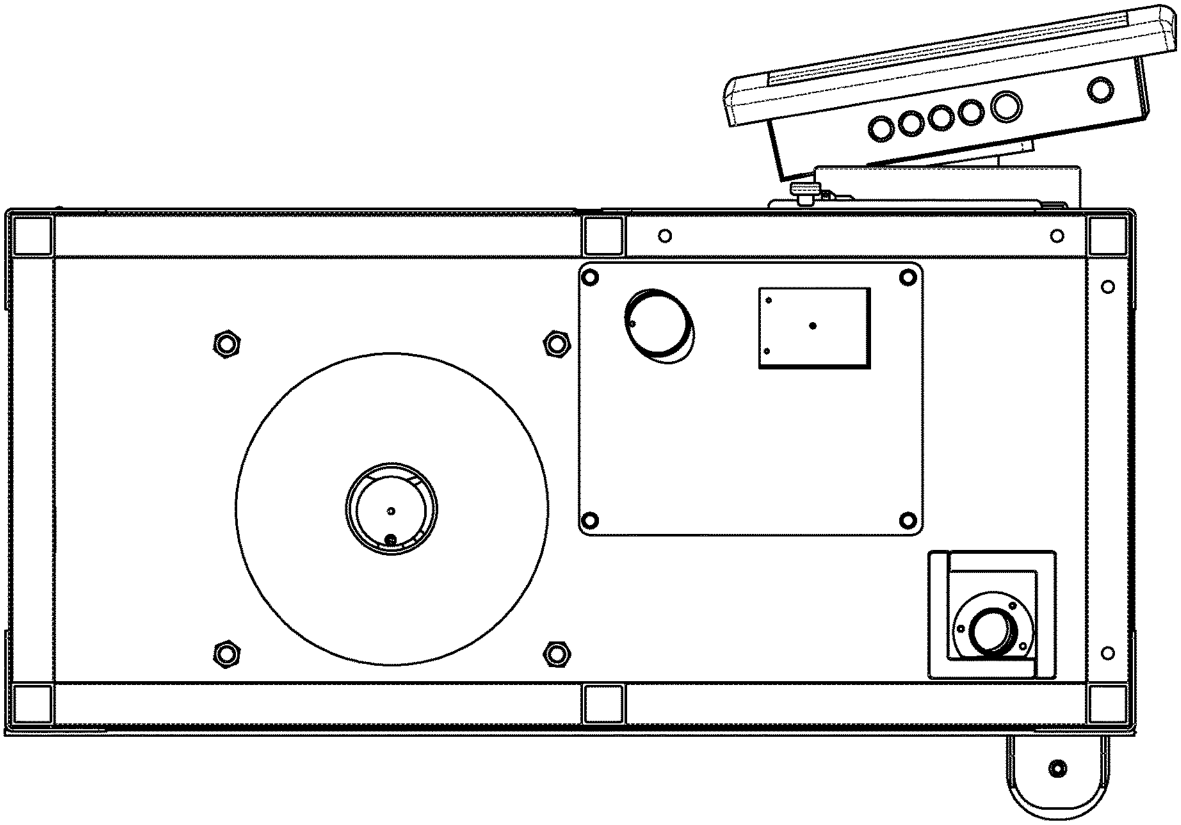
FIG. 20 is an underneath view of an embodiment of a floor of the dispensing and loading chambers.

FIG. 20 shows a preferred embodiment of the disclosure where the floor of the dispensing chamber is removable. In this embodiment, screws are accessible underneath the floor for removing the floor in case of major decontamination. The contaminated floor can be either replaced by another floor, and be cleaned or let decayed.

Figure 21:
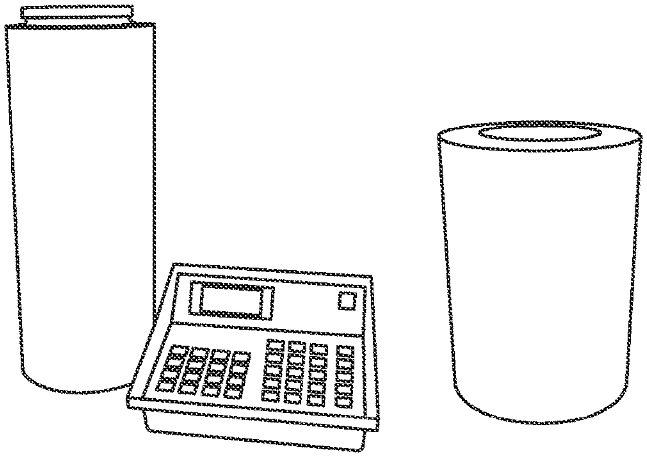
FIG. 21 is a view of an ion chamber well and a digital keypad of a dose calibrator, and a shield made of piled lead rings for receiving the ion chamber.

FIG. 21 shows from left to right a dose calibrator comprising an ion chamber well and a digital keypad to change the ion chamber settings when different isotopes are tested, and shield made of piled lead rings for receiving the ion chamber well inside and providing a lower background radiation dose. Dose calibrators are commercially available such as dose calibrator model CRC15R, or dose calibrator model CRC25C from Capintec Inc., Ramsey, N.J., USA. Shields for dose calibrator are commercially available such as Capintec Environmental Shield model 7300-2450.

Figure 22:
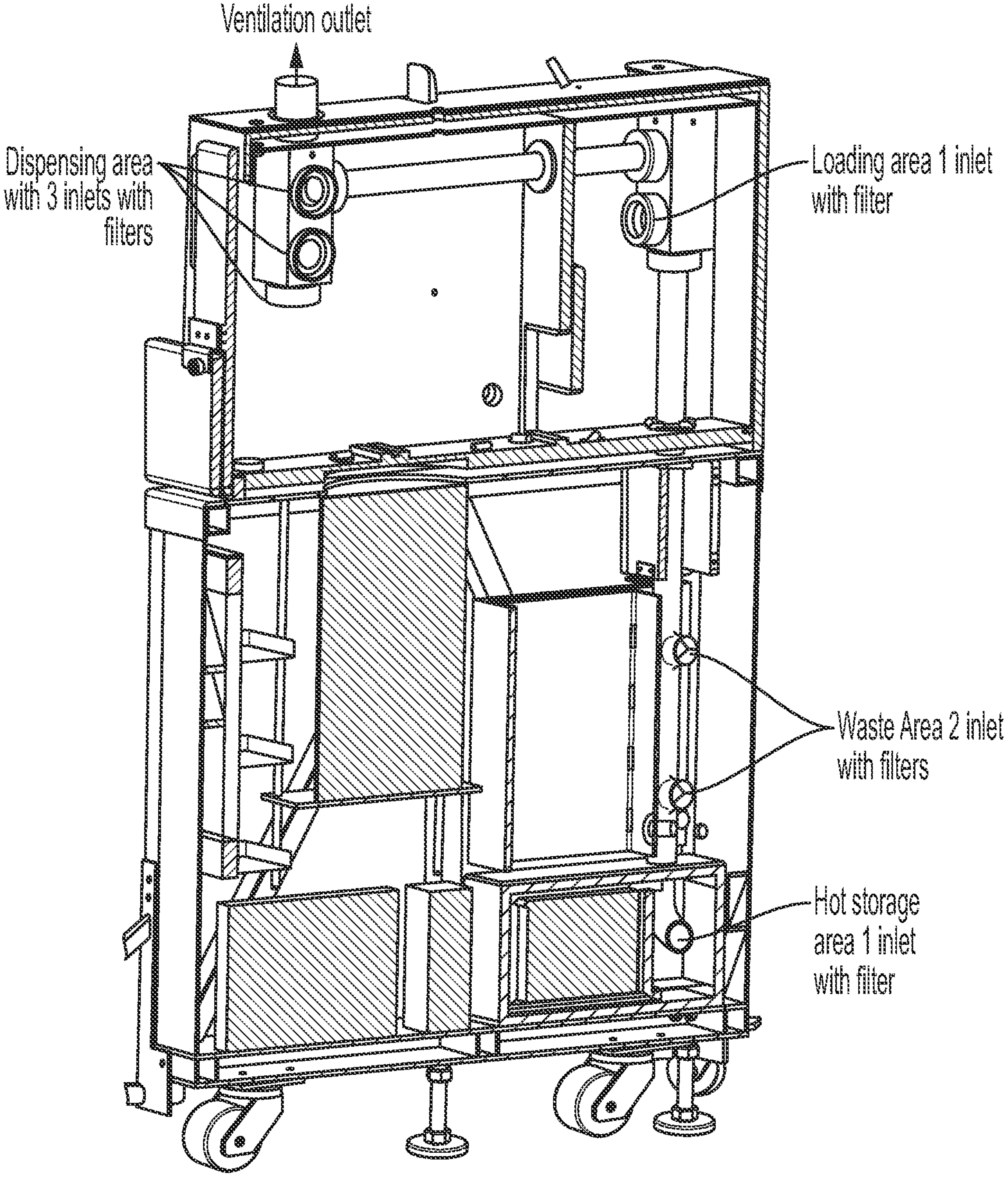
FIG. 22 is a perspective view of a cross-section of the system showing an embodiment of the ventilation system.

FIG. 22 provides a view of a preferred embodiment of the ventilation system that ventilates every area that may contain radioactivity. In this preferred embodiment, the ventilation system is arranged so as to provide three inlets in the dispensing chamber, one inlet in the loading chamber, two inlets in the waste area, and one inlet in a storage chamber. Each inlet is designed to receive a filter that can be easily changed for a new one. In a preferred embodiment, the used filters can be inserted in the waste container and let decayed. The filters are preferably composed of charcoal.

Figure 23:
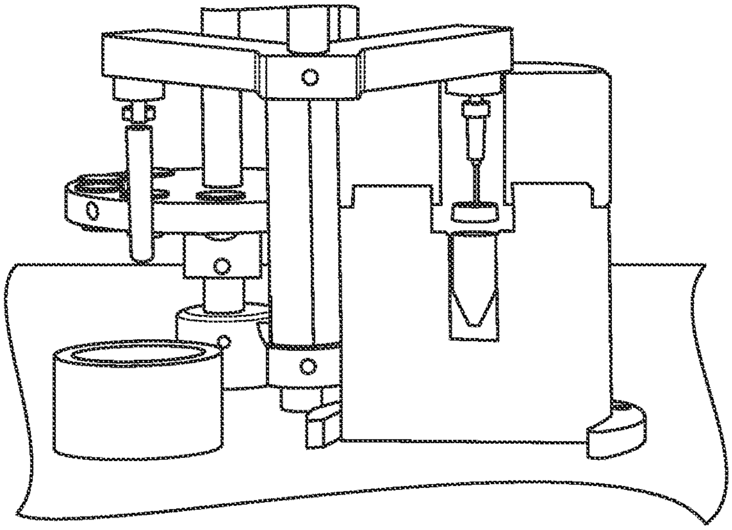
FIG. 23 is a side view of the syringe controller and a cross-section of the shielded container of a vial containing a radioactive solution.
Figure 24:
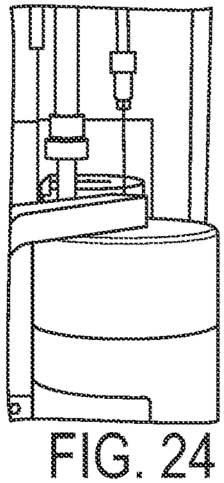
FIG. 24 is a perspective view of a shielded container and the needle of the syringe.
Figure 25:
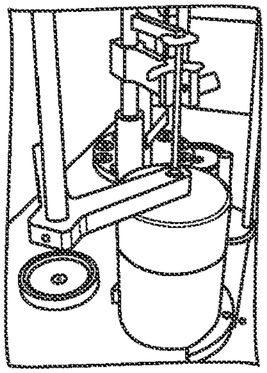
FIG. 25 is another perspective view of a shielded container that shows the syringe and the syringe controller.

FIG. 23 shows a cross-sectional view of the shielded container that encloses a vial having a conic bottom and containing a concentrated radioactive solution. FIG. 24 provides a perspective view of the shielded container of FIG. 23. FIG. 25 provides another perspective view of the shielded container of FIG. 23 with a perspective view of the syringe and its syringe controller. The shielded container is preferably made of lead or tungsten.

The systems of the disclosure include a chute manipulator extending vertically through the shield material into the dispensing chamber. Chute manipulators according to the disclosure are substantially hollow structures that supply a pathway for introducing containers to the chamber. Containers that pass through the chute manipulators are preferably capsules or part of capsules. The chute manipulator may be made from any suitable material such as, for example, lead, tungsten, and other metals and allows that provide an effective barrier to radioactive species. In cross-section, the chute manipulator may have any shape, provided that the shape allows the container to pass through the chute. Preferably, the shape of the chute manipulators substantially corresponds to the shape of the container. In certain embodiments of the disclosure, chute manipulators can be interchangeable such that each is adapted for use with specific containers. In certain embodiments, the chute manipulator is treated (as, for example, with a lubricant) to reduce friction. A rod that is adapted to pass through the chute manipulator and engage the capsule may be provided. This rod may be used to tamp on half of a capsule onto its other half located in the securing unit. Preferably, the capsule is composed of an external capsule and an internal capsule filled with a pharmaceutically absorbent material for adsorbing an aliquot of radioactive solution. The internal capsule is made of a material that can be punctured by the needle of the syringe without collapsing or changing its overall shape. When filling a capsule, a user preferably inserts a capsule that has its top half of the external capsule being removed; injects an aliquot of radioactive solution inside the internal capsule by means of the syringe and the syringe controller; inserts top half of the external capsule; and tamp said top half on the lower half of the capsule with the rod adapted to that effect.

The systems of the present disclosure also include a securing unit that is disposed in the chamber underneath the chute manipulator and is adapted to receive a container through the chute. Securing units according to the disclosure generally are capable of receiving at least one container and, preferably, more than one container. The securing unit is preferably a carousel or a portion of a carousel that may rotate to receive several capsules, one after the other, after having rotated the carousel about a vertical axis and without moving the chute manipulator. The portion of the securing unit that receives the container preferably has a shape that corresponds to the shape of the container. In embodiments in which the securing unit receives more than one container, the securing unit can be capable of being indexed, that is, of moving each container sequentially past a given work area. Indexing is useful for allowing the securing unit to receive further containers, to allow the containers to be filled, and/or to move the containers to an area where they may be removed from the securing unit. Preferably, the securing unit is a carousel or a portion of a carousel, but all shapes that allow indexing, for example, a rectangle with an array of ports, are contemplated.

Metering of the aliquot can be effected through operation of a controller. Syringe controller amenable to the practice of this disclosure include a computer or computing devices such as microprocessors, microcontrollers, capacitors, switches, circuits, logic gates, or equivalent logic devices. In one embodiment, the computer provides a plurality of volumes from which to select. Alternatively, the computer can provide for data entry to specify the volume desired. The computer may also be used to achieve a certain dosage. For example, if the concentration of stock solution is provided, the computer may calculate the volume required to attain a certain radioactive dose. Moreover, if a dosage of a certain radioactivity will be required for administration later, for example, two days later, the computer can account for the radioactive decay rate by dispensing an aliquot which has a radioactivity greater than the desired dosage by an amount representing the decay factors occurring over the time between dispensing and administration. Those skilled in the art will readily appreciate these and other desirable features of the computer based on the foregoing, as well as how to obtain them, such as by programming.

For use in dispensing radiopharmaceuticals or other types of potentially hazardous material, the syringe may require rinsing or sterilizing. A plurality of optional holding containers are provided for receiving the syringe needle. These holding containers may contain conventional rinse or sterilization solutions. In certain embodiments, the rinse solution is water, saline solution or isopropyl alcohol. In a preferred embodiment, the syringe rinsing is automated by the computer.

Radioactive solution that can be dispensed by the system of the present disclosure, includes without limitation, Technetium-99m, Iodine-123, Iodine-125, Iodine-131, Phosphorous-32, Indium-111, Cobalt-57, and/or Chromium-51.

A guide lid according to certain embodiments of the present disclosure is adapted to be placed on the stock solution container to guide the needle of the syringe to the stock solution vial. The guide lid may be formed from, for example, lead or tungsten, and has a generally tapered inner wall that can direct objects placed therein to the central portion of the area that the wall defines.

Certain features are, for clarity, described herein in the context of separate embodiments, but may also be provided in combination in a single embodiment. Conversely, various features that are, for brevity, described in the context of a single embodiment, may also be provided separately or in any sub-combination. Further, reference to values stated in ranges include each and every value within that range.

After reading the concepts that have been described with reference to specific embodiments, skilled artisans will appreciate that other aspects, modifications, changes, and embodiments are possible without departing from the scope of the disclosure as set forth in the claims below. Accordingly, the specification and figures are to be regarded in an illustrative rather than a restrictive sense, and all such modifications are intended to be included within the scope of disclosure.

Many aspects and embodiments have been described above and are merely exemplary and not limiting. Benefits, advantages, solutions to problems, and any feature that may cause the same to occur are not to be construed as a critical, required, or essential feature of any or all the claims.

What is claimed:

1. A container filling system comprising:

a. a dispensing chamber that is made of a shielding material, and having:
   i. a first side opening,
   ii. a second side opening,
   iii. at least one rod inside the dispensing chamber that vertically extends outside and above the dispensing chamber for manipulating the position of a syringe that is located inside,
   iv. a chute manipulator extending vertically inside and outside the dispensing chamber for sliding a capsule inside the dispensing chamber,
   v. a capsule securing unit having at least one receptacle has a size adapted to tightly receive a capsule that has slid inside the dispensing chamber, and
   vi. a shielded window for allowing a user of the system to see the syringe and capsule securing unit;

b. a loading chamber that is made of a shielding material, and having a first side opening and second side opening, the second side opening is in communication with the first side opening of the dispensing chamber, the first side opening provides access to a user hand for introducing a material;

c. a sliding door for alternatively closing and opening the first side opening of the dispensing chamber and therefore closing communication with the loading chamber;

d. a door for alternatively closing and opening the second opening of the dispensing chamber;

e. a syringe controller for controlling the syringe;

f. a computer that activates the syringe controller; and g. a waste container located at a level within the system that is lower than a level at which the dispensing chamber or the loading chamber are located within the system, wherein the waste container is made of or surrounded by a shielded material and comprises a first waste chute interconnecting the dispensing chamber or the loading chamber to the waste container and allowing waste material to slide into the waste container.

2. The container filling system of claim 1, wherein the waste container comprises a second waste chute that interconnects the loading chamber or the dispensing chamber and the waste container for allowing waste material to slide into the waste container.

3. The container filling system of claim 2, wherein the second waste chute merges with the first waste chute.

4. The container filling system of claim 1, wherein the waste container further comprises at least two compartments that are upwardly opened, wherein the waste container can move in order to place one of the compartments in communication with the first waste chute for receiving the waste material.

5. The container filling system of claim 4, wherein the waste container comprises three compartments.

6. The container filling system of claim 4, wherein each of said at least two compartments are of equal volume, and comprise a pie shape.

7. The container filling system of claim 4, further comprising a waste container controller for controlling the movement of the waste container, wherein the computer causes the controller to rotate the waste container so that a first one of the compartments remains in communication with the first waste chute during a pre-determined period of time.

8. The container filling system of claim 7, wherein the pre-determined period of time is such that, upon one full rotation of the waste container, the first one of the compartments contains waste material that has completely decayed.

9. The container filling system of claim 1, wherein the first waste chute comprises a blockage sensor that is able to detect the presence of any object blocking the sliding of a waste material through the first waste chute.

10. The container filling system of claim 2, wherein the second waste chute comprises a blockage sensor that is able to detect the presence of any object blocking the sliding of a waste material through the second waste chute.

11. The container filling system of claim 1, wherein the waste container comprises level sensor that is located inside the waste container for detecting a level of waste material within said waste container.

12. The container filling system of claim 9, wherein the blockage sensor is in communication with the computer, and upon receiving information from the blockage sensor that an object is blocking the sliding of a waste material within the first waste chute, the computer displays the information on a user interface.

13. The container filling system of claim 10, wherein the blockage sensor is in communication with the computer, and upon receiving information from the blockage sensor that an object is blocking the sliding of a waste material in the second waste chute, the computer displays the information on a user interface.

14. The container filling system of claim 11, wherein the level sensor is in communication with the computer, and upon receiving information from the level sensor that the level of waste material has reached a pre-determined level, the computer displays said information on a user interface.

15. The container filling system of claim 1, further comprising a bar code scanner for scanning a bar code that provides information about a radioactive solution, said information includes one or more of the volume of the radioactive solution, the concentration of radioactive compound in the radioactive solution, and the date of calculation of said concentration of radioactive compound; wherein the computer has a memory that calculates a required dose volume of radioactive solution based on i) the information provided by the bar code, and ii) a required dose input corresponding to a required patient dose at a specific date.

16. The container filling system of claim 15, wherein the computer activates the syringe controller for drawing said required dose volume of radioactive solution and injecting into a capsule.

17. The container filling system of claim 16, further comprising a user interface for receiving said required dose input.

18. The container filling system of claim 15, wherein the computer activates the syringe controller for drawing said required dose volume of radioactive solution that is needed and injecting said required dose volume into a vial, and calculating the volume of non-radioactive solution that is needed to prepare the required dose volume in said vial.

19. The container filling system of claim 18, further comprising a user interface for receiving said required dose input and said required volume input.

20. The container filling system of claim 1, further comprising an entrance tray that moves between an internal position that is inside the dispensing chamber and an external position where at least one portion of the entrance tray extends inside the loading chamber.

21. The container filling system of claim 20, wherein the material that is introduced in the loading chamber includes a vial containing a radioactive solution, a vial containing a non-radioactive solution, or an empty vial.

22. The container filling system of claim 1, further comprising an exit tray that moves between an internal position that is inside the dispensing chamber and an external position where at least one portion of the exit tray extends outside the second side opening of the dispensing chamber.

23. The container filling system of claim 1, further comprising a door for alternately closing and opening the first side opening of the loading chamber.

24. The container filling system of claim 1, further comprising a storage chamber that is made of a shielding material for storing radioactive material.

25. The container filling system of claim 1, further comprising a ventilation system that creates a negative pressure in the dispensing chamber, the loading chamber, and the waste container of the container filling system, wherein each door of the container filling system does not hermitically close so that ambient air enters into the container filling system when the ventilation system is active.

26. The container filling system of claim 25, further comprising a ventilation system that creates a negative pressure in the dispensing chamber, the loading chamber, the waste container and the storage chamber of the container filling system, wherein each door of the container filling system does not hermitically close so that ambient air enters into the container filling system when the ventilation system is active.

27. The container filling system of claim 25, wherein the ventilation system comprises multiple ventilation ducts and each duct has at least one disposable filter.

28. The container filling system of claim 1, wherein the computer is connected to a network for remote access.

29. The container filling system of claim 1, wherein the dispensing chamber has a floor that is accessible through an underside of the dispensing chamber and can be detached from the dispensing chamber for replacement.

30. The container filling system of claim 1, further comprising a capper manipulator that extends vertically inside and outside the dispensing chamber for engaging a screw cap of a vial and alternately remove or place the screw cap on the vial.

31. The container filling system of claim 1, wherein the computer has a memory that causes the syringe controller to manipulate the syringe for a rinsing cycle with a non-radioactive solution.

32. The container filling system of claim 1, wherein the loading chamber further comprises a rotary platform that allows a heavy material to be placed on the rotary platform in a position proximate to the first side opening of the loading chamber, and to be moved in proximate to the entrance tray in the external position by rotation of the rotary platform.

33. The container filling system of claim 1, wherein the dispensing chamber represents a first dispensing chamber, the loading chamber represents a first loading chamber, and the container filling system further comprises:

a. a second dispensing chamber that is substantially identical to the first dispensing chamber; and b. a second loading chamber that is substantially identical to the first loading chamber;

wherein the computer activates the syringe controller of the first dispensing chamber and the syringe controller of the second dispensing system.

34. The container filling system of claim 1, further comprising a dose calibrator in communication with the dispensing chamber via a passage, a carrier for transporting a container from the dispensing chamber to the dose calibrator through said passage, wherein the carrier allows the dose calibrator to detect radioactivity inside the container, and a carrier controller for controlling the movement of the carrier during transportation.

35. The container filling system of claim 34, wherein the passage is located in a floor of the dispensing chamber and is substantially vertical.

* * * * *